United States Patent
Bau et al.

(10) Patent No.: US 9,026,526 B1
(45) Date of Patent: May 5, 2015

(54) PROVIDING IMAGES OF NAMED RESOURCES IN RESPONSE TO A SEARCH QUERY

(71) Applicant: Google Inc., Mountain View, CA (US)

(72) Inventors: David Bau, Lincoln, MA (US); Gunes Erkan, Brooklyn, NY (US); Osman Ahmed Osman, Giza (EG); Scott A. Safier, New York, NY (US); Ching Yu Conrad Lo, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/019,921

(22) Filed: Sep. 6, 2013

Related U.S. Application Data

(63) Continuation of application No. 12/179,182, filed on Jul. 24, 2008, now Pat. No. 8,538,943.

(51) Int. Cl.
*G06F 17/30* (2006.01)
*G06K 9/00* (2006.01)

(52) U.S. Cl.
CPC ...... *G06F 17/30247* (2013.01); *G06K 9/00288* (2013.01)

(58) Field of Classification Search
USPC ................. 707/723, 706, 758, 748, 737, 728; 382/305
See application file for complete search history.

(56) References Cited

U.S. PATENT DOCUMENTS

| | | | |
|---|---|---|---|
| 6,363,377 B1 | 3/2002 | Kravets et al. | |
| 6,813,395 B1 | 11/2004 | Kinjo | |
| 7,739,281 B2 | 6/2010 | Najork | |
| 7,801,893 B2 * | 9/2010 | Gulli' et al. | 707/737 |
| 7,836,050 B2 * | 11/2010 | Jing et al. | 707/728 |
| 7,877,384 B2 * | 1/2011 | Yu et al. | 707/723 |
| 8,266,140 B2 | 9/2012 | Bourges-Waldegg et al. | |
| 8,285,713 B2 * | 10/2012 | Luo et al. | 707/723 |
| 8,312,022 B2 * | 11/2012 | Wilde et al. | 707/740 |
| 8,315,442 B2 | 11/2012 | Gokturk et al. | |
| 8,345,982 B2 | 1/2013 | Gokturk et al. | |
| 8,538,943 B1 * | 9/2013 | Bau et al. | 707/706 |
| 8,559,682 B2 * | 10/2013 | Zhang et al. | 382/118 |
| 2006/0248035 A1 | 11/2006 | Gendler et al. | |
| 2006/0251339 A1 | 11/2006 | Gokturk et al. | |
| 2006/0253491 A1 * | 11/2006 | Gokturk et al. | 707/104.1 |

(Continued)

OTHER PUBLICATIONS

Office Action issued in U.S. Appl. No. 12/179,182 on Jan. 21, 2011, 11 pages.

(Continued)

*Primary Examiner* — Jean M Corrielus
(74) *Attorney, Agent, or Firm* — Fish & Richardson P.C.

(57) ABSTRACT

Systems, computer program products, apparatus, and methods are described that perform operations including receiving a search query that includes a name, receiving multiple resources that have been identified by a search engine as best satisfying the search query, wherein the identified multiple resources include a resource including a plurality of images. The operations include identifying an image of the plurality of images displaying a face of the person. The image is identified based on a description associated with the image. The description is based at least in part on one or more resources included in the search results. The operations further include providing the identified image with the search results. The search results are provided as a plurality of links. Each link identifies a corresponding resource of the identified plurality of resources.

20 Claims, 3 Drawing Sheets

(56) References Cited

U.S. PATENT DOCUMENTS

| | | |
|---|---|---|
| 2007/0078846 A1* | 4/2007 | Gulli et al. .................... 707/5 |
| 2007/0081744 A1 | 4/2007 | Gokturk et al. |
| 2007/0172155 A1 | 7/2007 | Guckenberger |
| 2007/0239778 A1* | 10/2007 | Gallagher ................ 707/104.1 |
| 2008/0080745 A1* | 4/2008 | Vanhoucke et al. .......... 382/118 |
| 2008/0215561 A1* | 9/2008 | Yu et al. ....................... 707/5 |
| 2008/0222143 A1* | 9/2008 | Backer et al. ................. 707/5 |
| 2009/0012940 A1* | 1/2009 | Ives et al. ..................... 707/3 |
| 2009/0094137 A1* | 4/2009 | Toppenberg et al. .......... 705/27 |
| 2009/0132478 A1 | 5/2009 | Korst et al. |
| 2009/0210391 A1* | 8/2009 | Hall et al. .................... 707/3 |
| 2009/0234842 A1* | 9/2009 | Luo et al. ..................... 707/5 |
| 2009/0240674 A1* | 9/2009 | Wilde et al. .................. 707/4 |
| 2009/0292696 A1* | 11/2009 | Shuster ....................... 707/5 |
| 2011/0219025 A1 | 9/2011 | Lipson et al. |
| 2012/0221596 A1* | 8/2012 | Hall et al. .................. 707/769 |
| 2013/0166529 A1* | 6/2013 | Shuster ..................... 707/706 |

OTHER PUBLICATIONS

Final Office Action issued in U.S. Appl. No. 12/179,182 on Jul. 8, 2011, 10 pages.

Office Action issued in U.S. Appl. No. 12/179,182 on Mar. 1, 2012, 10 pages.

Final Office Action issued in U.S. Appl. No. 12/179,182 on Jul. 6, 2012, 12 pages.

Notice of Allowance issued in U.S. Appl. No. 12/179,182 on May 23, 2013, 11 pages.

* cited by examiner

PROVIDING IMAGES OF NAMED RESOURCES IN RESPONSE TO A SEARCH QUERY

CROSS-REFERENCE TO RELATED APPLICATION

This application is a continuation of U.S. application Ser. No. 12/179,182, filed Jul. 24, 2008, the contents which is incorporated by reference.

TECHNICAL FIELD

This specification relates to searching for content links.

BACKGROUND

A variety of information can be made available to users on a network, such as the Internet. In response to receiving search queries, search engines effectively search multiple content hosts hosting multiple resources to identify resources that satisfy the received queries. Generally, search engines present search results as a list of links where each link enables a user to access one of the identified resources. An identified resource can have one or more additional embedded resources. Generally, search engines provide snippets of information adjacent to a link. The snippets include portions of the identified resource, e.g., text, that are identical or similar to the text included in the search query. The resources stored at the content hosts and identified by search engines can be images, or can include one or more images.

SUMMARY

This specification describes systems and methods that detect that a search query includes a name of a person. In addition to displaying search results that satisfy the search query, the systems and methods described display one or more images containing the face of the person whose name is in the search query.

In one aspect, a computer-implemented method includes receiving multiple resources that have been identified by a search engine as satisfying a search query that includes a name of a person. The identified multiple resources include a first resource that includes multiple images. The method includes identifying a first image of the multiple images as being an image showing a face of the person, based on a description associated with the first image. The description is included in one or more resources included in the search results. The method includes providing the first image with the search results. The search results include multiple links. Each link points to a corresponding resource of the identified multiple resources. The first image is associated in the search results with the first resource.

This, and other aspects, can include one or more of the following features. The method can include providing the search results for display in a display device, and providing the first image for display with the search results. The method can also include determining that the search query includes the name of a person. Determining that the search query can include a name of a person can further include determining a probability that a term in the search query is a name of a person, and comparing the term against a stored list of terms that are not names of persons and determining that the term is not a name of a person. More than one image of the multiple images can be identified as displaying the face of the person whose name is in the search query. The method can further include providing the more than one image for display with the search results. The method can further include associating a score with each image of the more than one image. The score can represent a quality of an image as such. The method can include ranking the more than one image based at least in part on the score associated with each image, and selecting an image of the more than one image having a highest rank. The method can also include selecting an image of the more than one image having a highest rank. The method can include providing the image having the highest rank for display with the search results. Associating a score with each image of the more than one image can include associating a probability with each image of the more than one image based on image size, associating a probability with each image of the more than one image based on image resolution, associating a probability with each image of the more than one image based on one or more colors in each image, and computing the score of each image by combining at least the probability based on image size, the probability based on image resolution, and the probability based on the one or more colors. The first resource can be a web page in which the multiple images are included. These and other aspects can be implemented as a computer program product tangibly embodied in a computer-readable medium, as systems including a processor and a computer program product tangibly embodied in a computer-readable medium, where the computer program product causes the processor to perform the methods described herein, and systems including means for performing the methods described herein.

Particular implementations of the subject matter described in this specification can be implemented to realize one or more of the following advantages. When a user sees an image of a person adjacent to a link that points to a web page, the user can easily determine if the web page is relevant to the user's search query. This can reduce the time spent by a user searching for content. In addition, the content and quality of the image is visible to the user without the user having to additionally select the link. Further, displaying images along with search results enhances user experience.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Search engines crawl resources at multiple content hosts to gather information and generate a computer-searchable index of resources. Upon receiving a search query, a search engine identifies resources that the search engine determines best satisfy the search query. The search engine generates search results to present the identified resources. In some implementations, to support the search result presentation techniques that will be described later, the gathering of information includes a process of determining image types. Such gathering of information can be implemented in a system that includes an image search facility, the operations of which will be described in reference to FIG. 1.

Figure 1:
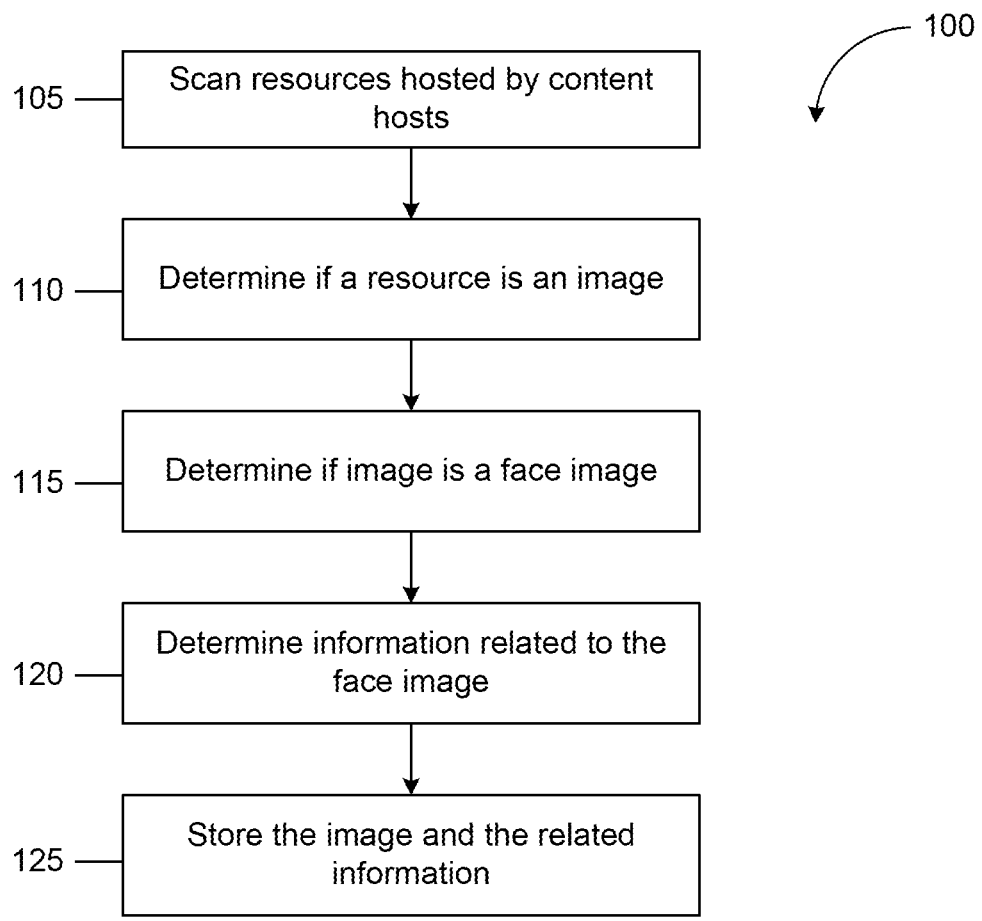
FIG. 1 is a flow chart of an example process of scanning resources to determine image types.

FIG. 1 is a flow chart of an example process 100 of scanning resources to determine image types. The process scans resources hosted by content hosts (step 105). For example, the image search facility scans descriptive information in the computer-searchable index generated by the search engine that is related to the resources hosted by the content hosts to identify images. In some implementations, the image search facility determines if a resource is a file. If the resource is a file, the image search facility further determines that the file is an image file.

The process identifies a resource as being an image (step 110). For example, the image search facility identifies a file type of a resource in the computer-searchable index and identifies the resource to be an image based on the file type. The image search facility identifies a file name of the resource and based on the extension of the file name, e.g., JPG, TIFF, PNG, determines that the resource is an image.

The process determines a likelihood that the image is a face image (step 115). A face image is an image containing a person's face. To do so, the image search facility runs a software program that implements one or more face detection algorithms, for example, the ones described in "Robust Realtime Object Detection," P. Viola, M. Jones, Second International Workshop on Statistical and Computational Theories of Vision-Modeling, Learning, Computing, and Sampling, "A Statistical Method for 3D Object Detection Applied to Faces and Cars," "Neural network-based face detection," H. Rowley, S. Baluja, and T. Kanade, IEEE Patt. Anal. Mach. Intell., vol. 20, pages 22-38, 1998, and H. Schneiderman and T. Kanade, IEEE Conference on Computer Vision and Pattern Recognition.

The process extracts information related to the image (step 120). Information related to the image includes a file name of the image, alt-text associated with an image, image metadata, e.g., image resolution, and the like. The alt-text is text in an XML document that is in included in an HTML document to be displayed by a web browser when the image cannot be displayed. In some implementations, the image search facility extracts information related only to face images, while in other implementations information related to all images is extracted. The extracted information related to a resource can be obtained from the content hosts where the resource is stored.

The process stores the image and the extracted information (step 125). In some implementations, all the images and the related information are stored in a storage device operatively coupled to the search engine. In some implementations, extracted information related to the resources is stored in a computer-searchable index generated by the image search facility that is separate from the search engine's index. In some implementations, the image search facility stores extracted information relating to face images in one computer-searchable index, and that relating to other images in another computer-searchable index. In some implementations, all the extracted information is appended to the search engine's computer-searchable index.

In this manner, as the search engine develops an index of resources for efficient searching, the image search facility develops a repository of images included in the resources and information related to the images. The search engine identifies resources based on extracted information in the index, and the image search facility identifies images from the repository. The search engine generates search results, e.g., as a list of links that enable a user to access the identified resources.

Figure 2:
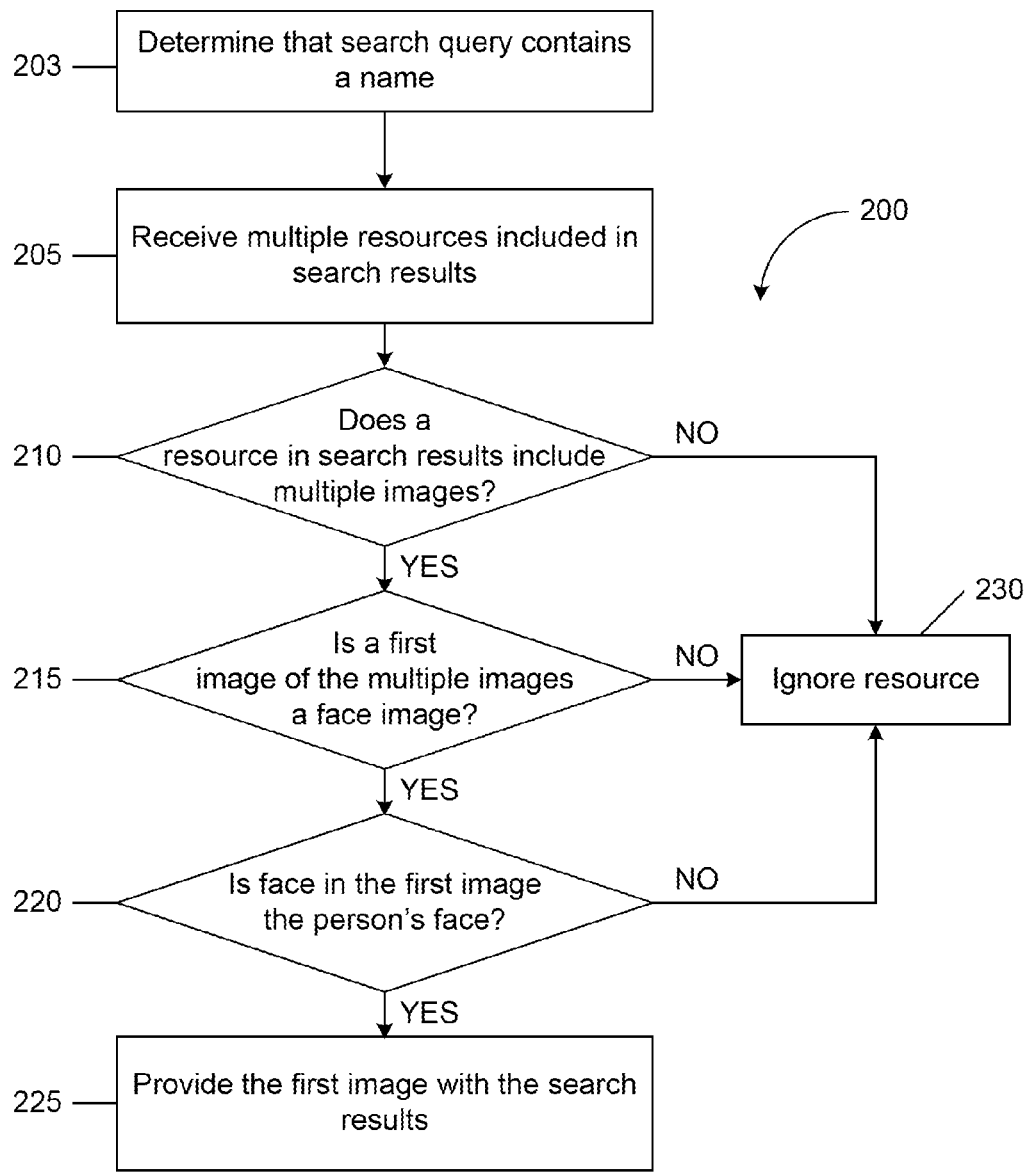
FIG. 2 is a flow chart of an example process of selecting face images for including in search results.

FIG. 2 is a flow chart of an example process 200 of selecting face images to include in search results. The process determines if the search query contains a name (step 205). In some implementations, determining if a search query contains a name includes building a probability model by associating a probability with each term in the search query that represent the likelihood that the respective term is a first name, a middle name, or a last name. To build the probability model, a base probability, pterm_base=P(term|query), of the likelihood that a term appears in a query, is determined. Further, the probability, pterm_first=P(term appears as a first name|name in training data), is determined. Then the parameter [(pterm_first/pterm_base)*tuning_constant] is determined. This parameter is a Bayesian estimate of the probability that the term is being used as a first name when it appears in a search query. This process is repeated to determine similar parameters for middle and last names. Assuming independence of the term probabilities, a probability product or a geometric mean of probabilities is used to estimate the probability that the entire search query is being used as a person's name.

For example, to determine a probability that a term in a search query is either a first, middle, or last name, a dictionary of names is created or obtained or both, and each term in the search query is compared against the dictionary of names. The dictionary can include terms that are first names and terms that are last names. Additional information in the search query, for example, a title preceding a name, a suffix of a name, hyphenated names, and the like, can be included in the calculations of probabilities to be associated with terms in the search query. Additional details regarding techniques for associating probabilities with terms in the search query can be found in "Personal Name Classification in Web Queries," by Shen et al. (Web Search and Data Mining '08, February 11-12, Palo Alto, Calif.).

In addition to associating probabilities with search terms, phrases in the search query can be compared against a collection of phrases that are known to not be a name of a person, even though they match the first-middle-last name grammar that personal names follow. Such phrases can include linked terms, for example, "Jasmine Rice," which is not a person's name. A list of phrases that are known to not be personal names can be identified or obtained. In one example, the phrase "Hong Kong" is identified as not being a personal name. If a search query includes "John Hong Kong", from the determination that "Hong Kong" is a meaningful phrase, it is determined that the phrase "John Hong" is not a person's name.

In some implementations, it is the search engine that determines if the search query includes or is a name. In other implementations, it is another part of the system, e.g., the image search facility, that compares the search query with the database. If the search engine determines that the search query is not a name, then the search engine need not transmit the name and the search results to the image search facility to identify face images. In other implementations, both the search engine and the image search facility receive the search query. While the search engine identifies resources that satisfy the search query, the image search facility compares the search query with the database of names and determines if the search query is a name.

The process receives the multiple resources included in the search results (step 210). For example, the image search facility receives the search results from the search engine. In addition, the search engine also transmits the search results, i.e., the list of links enabling a user to access the identified resources, to the image search facility. The image search facility determines whether any of the resources to which links in the search results point are face images. The image search facility has previously extracted information related to resources stored in the content hosts. The image search facility uses this previously extracted information to identify face images. In alternative implementations, the image search facility extracts information related to the resource to which links in the search results point after receiving the search results. In such implementations, the determination of the likelihood that an image is a face image is performed in real-time.

The process checks whether a resource in the search results is an image (step 215). For example, the image search facility checks if a resource in the search results can be found in the computer-searchable index of image resources that was previously created (step 110). If the process determines that a resource in the search result is not an image, then the process ignores the resource (step 235).

The process checks whether an image is a face image (step 220). For example, the image search facility determines whether an image is a face image or not based on previously extracted information in the facility's computer-searchable index. If the image search facility determines that the image is not a face image, then the image is ignored (230).

The process checks whether the face in the face image is the face of the person whose name was included in the search query (step 225). For example, the search query received by the search engine contains the name "John Doe." The image search facility receives search results including links that point to images, some of which display John Doe's face. The computer-searchable index, generated by the image search facility, already includes the information related to the face images in the search results. Based on this information, the image search facility determines those face images included in the search results that include, e.g., "John Doe" in the file name, and "John Doe" as the alt-text. A face image is embedded in a web page with other resources including documents. The image search facility scans the text in such documents to determine if "John Doe" is included in the text. Each of these determinations is a factor in determining if the face in the face image is that of John Doe. Other factors can include the size of the face within the image, the number of faces within the image, the aspect ratio of the image, the color content of the image, and the like. For each factor, the image search facility assigns a probability that the face image displays John Doe's face. Based on the probabilities of all the factors, the image search facility determines a combined probability that the face image displays John Doe's face. If the combined probability associated with an image is high, e.g., greater than a threshold probability, the image search facility includes the face image as one of the face images that can be displayed with the search results. If the probability is lower than a threshold value, the image search facility ignores the face image (235).

If the process determines that the face in the face image is the face of the person whose name is in the search query, the process includes the image in the images that can be displayed with the search results (step 230). For example, upon identifying face images that contain the face of the person whose name is in the search query, the image search facility makes available the identified images for inclusion in the search results. In some implementations, all the identified face images can be provided along with the search results, while, in other implementations, less than all of the identified face images can be provided. A search result can be associated with one face image. Alternatively, multiple search results can be associated with the same face image or multiple face images can be associated with the same search result.

Figure 3:
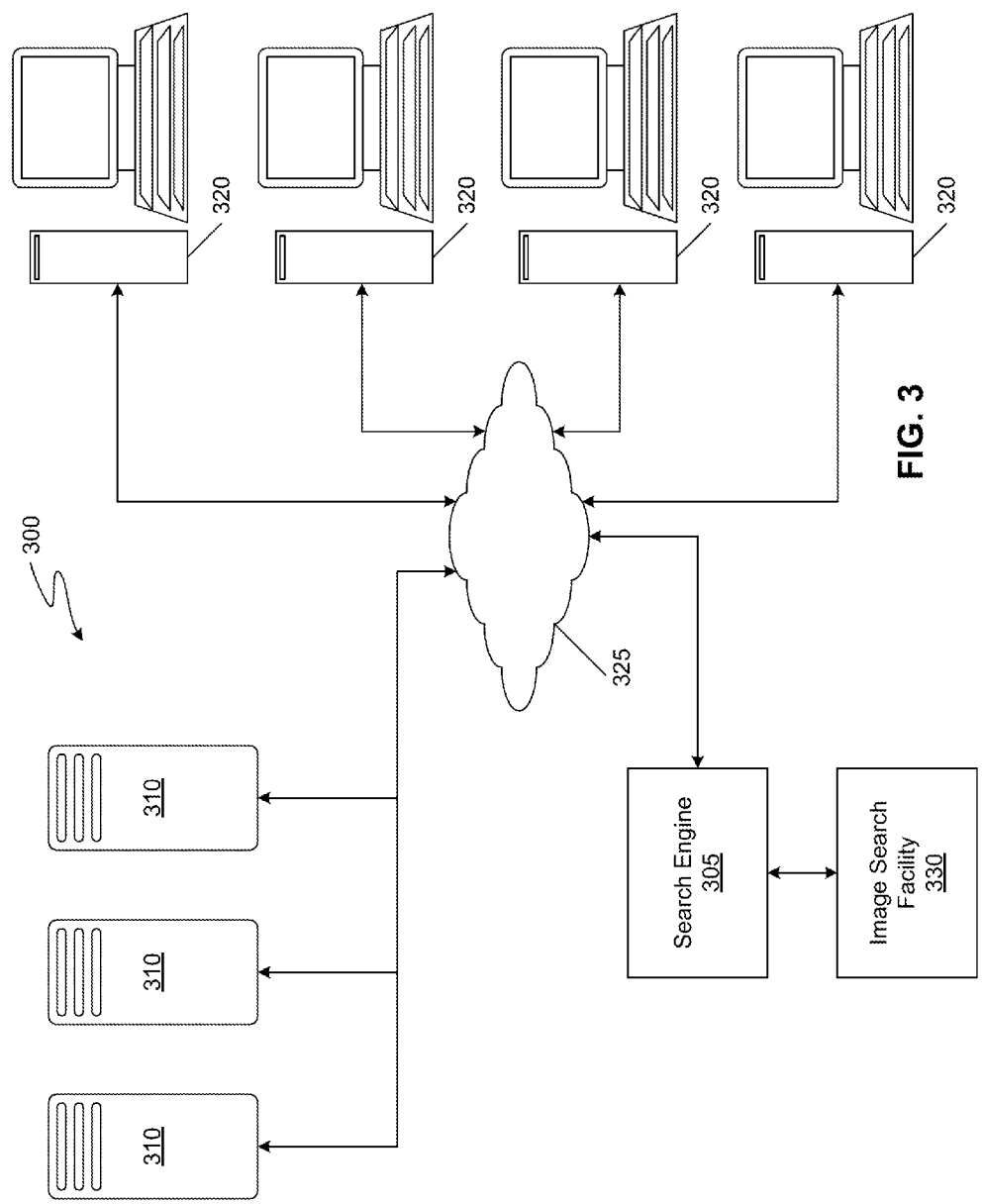
FIG. 3 is a schematic of an example system for searching for resources.

FIG. 3 is a schematic of an example of a system 300 for searching for resources. The system 300 includes a search engine 305 to provide search results identifying resources in response to receiving search queries from a user, one or more content hosts 310 hosting resources, several client devices 320 that communicate with the search engine 305 and the content hosts 310, and an image search facility 330 operatively coupled to the search engine 305 to identify images. The search engine 305 and the image search facility 330 are configured to perform the methods described in reference to FIGS. 1 and 2.

In some scenarios, the search engine 305 receives a search query, where the search query includes a name, e.g., a person's name. The search engine 305 searches the previously generated computer-searchable index of resources to identify resources that satisfy the search query and provides the identified resources as search results and displays the search results as a list of uniform resource locators (URLs) in the user interface, and each URL points to one of the identified resources. The search engine 305 compares the search query with a previously generated database of people's names to determine if the search query includes or is a person's name. The image search facility 330 identifies resources that are images, and further, to determine if the identified images display faces of people. Based on the face images identified by the image search facility 330, the search results and the name in the search query identified by the search engine 305, the system 300 identifies face images that have a likelihood of displaying the faces of the people whose names are included in the search query. The image search facility 330 includes the identified face images in the search results.

For example, a content host 310 is a server hosting a resource, e.g., a web page that includes four images, such as an image of a logo, an artwork image, a group photograph including a person, and a portrait photograph of the person. The received search query is text that contains the person's name. The search engine 305 identifies the web page that includes the four images as one of the resources that satisfies the received search query. The image search facility 330 identifies the embedded images in the web page and further determines that two of the four images include faces of people, and that one of the two face images contains the face of one person. Further, the image search facility 330 identifies descriptive resources that describe the identified face images to determine the person shown in a face image. The descriptive resources include text such as a name of an image file, alt-text associated with an image, metadata associated with the image, and the like. In addition, the image search facility 330 identifies text resources included in the search results generated by the search engine 305. The search engine 305 determines that the name in the search query is a person's name. In response, the image search facility 330 identifies the stored face image displaying the face of the person whose name is included in the search query. The image search facility 330 includes the multiple face images in the search results, and to the name in the search query.

In another example, a content host 310 hosts a web page that includes a news article about a concert, where the news article includes an image of the concert venue, an image of the band that performed at the concert, and a face image of the lead singer of the band. In response to a search query which contains the name of the lead singer of the band, the search engine 105 identifies the web page as a resource that satisfies the search query. The name of the image file of the concert venue image is "venue.jpg" and the associated alt-text is "venue." Similarly, the names of the image files of the band and the lead singer are "band.jpg" and "frontman.jpg," respectively, and the corresponding alt-texts are "band" and "frontman," respectively. Further, the news article includes text describing the concert, the performance of the band, the performance of the lead singer, and the like.

The image search facility 330 has previously extracted and stored information related to the multiple images, e.g., in the image search facility's computer-searchable index. For example, the image search facility 330 has previously identified the concert venue image based on the JPG file extension of "venue.jpg," "venue," and other image metadata. In addition to having previously identified the image of the band and the lead singer, the image search facility 330 has determined that "band.jpg" and "frontman.jpg" include face images.

When the image search facility 330 receives the search results generated by the search engine 305 including the web page with the embedded resources, the image search facility 330 looks up the extracted information to determine that "band.jpg" and "frontman.jpg" include face images, and that "frontman.jpg" displays the face of the lead singer of the band.

In this manner, the search engine 305 generates search results including resources that satisfy the search query that includes a name of a person, and the image search facility 330 identifies one or more face images included in the search results that display the face of the person whose name is in the search query. Further, the image search facility 330 determines which of the face images are to be included in the search results, when the search results are presented to a user who provided the search query. The search query is provided, e.g., by a user, in a client device 320 operatively coupled to the search engine 305 via one or more networks, e.g., the Internet. The search engine 305 presents the search results as a list of links in the user interface. Each link corresponds to a resource or to a resource in which multiple resources are embedded.

In some implementations, the search engine 305 associates a rank with each resource in the search results. The links in the search results can be arranged in a descending order based on the rank of the resource, such that links pointing to the highest ranking resources are displayed at the top of the list and links pointing to the lower ranking resources are displayed at the bottom of the list. The image search facility 330 can include in the search results, face images that are found only in the top ranked resources, e.g., the top 20 resources, resources that are ranked above a threshold rank, and the like. In such implementations, a face image that is included in a top ranked resources is displayed with the list of links. In some implementations, the search results can be displayed across multiple pages. The image search facility 330 can identify face images for the search results to be displayed only on the first page, and not for subsequent pages. In this manner, when the user requests to view the search results displayed on the second page, the image search facility 330 can be turned off. In alternative implementations, the image search facility 330 can be turned on for the first few pages.

While some resources do not include any face images or do not include face images that satisfy a received search query, some resources can include more than one face image of the same person or face images of more than one person. In such cases, the image search facility 330 identifies one face image from among multiple face images for displaying in the search results. For example, the search engine 305 includes in the search results, a web page that includes, among other images, a first image and a second image. The image search facility 330 determines that the first face image and the second face image are face images of two different people. The image search facility 330 associates a first face image with the first person and a second face image with the second person based on descriptive information that corresponds to each face image, where the descriptive information was previously identified. When the search engine 305 determines that a search query received is the name of the first person, the search engine 305 identifies the web page including the first and second face images as one of the resources that satisfy the search query. The image search facility 330 compares the name in the search query with the descriptive text of the first and second face images, and determines that the first face image displays the face of the person whose name is in the search query, and includes the first face image in the search results.

In some implementations, the image search facility 330 identifies multiple face images of the same person where the multiple face images are included in the same resource. For example, the resource is a web page including multiple face images of the same person. In such implementations, the image search facility 330 associates scores with each face image of the multiple face images based on several factors including face image size, face image colors, query text, the descriptive text associated with each face image, and the like. A face image with a large file size is associated a higher score than a face image with a smaller file size because the large file size image has a higher resolution than the smaller file size image. A color image is associated a higher score than a black and white or grayscale image, if both images are determined to display the same person's face. An image where a higher proportion of the image is occupied by a face, and where there are fewer faces, can be associated a higher score than an image with a larger number of faces or smaller faces within the image. The image search facility 330 selects the face image with the highest score for providing with the search results.

In some implementations, the search engine 305 identifies multiple resources as satisfying the search query, where each resource includes at least one face image of the same person. If the face image included in a first resource is different from a face image at a second resource, where both the first and second images are face images of the same person, then both face images are included in the search results. In such cases, the first image can be displayed in the search results adjacent to the link pointing to the first resource and the second image can be displayed adjacent to the link pointing to the second resource.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the disclosure have been described. Other implementations are within the scope of the following claims. For example, the actions recited in the claims can be performed in a different order and still achieve desirable results. In some implementations, the image search facility does not include a previously generated computer-searchable index of images. Rather, the image search facility determines those resources in the search results that are images, and those images in the search results that are face images. In some implementations, upon identifying images that are face images of the person whose name is in the search query, the image search facility stores the face images in a computer-searchable index.

In some implementations, the search engine identifies multiple images displaying the face of the person whose name is included in the search query. The search engine displays one of the multiple images adjacent to the link pointing to the resource where the image is included. When a user positions a cursor over the link, a balloon is displayed where thumbnails of the other images that display the person's face are displayed within the balloon. In some implementations, cropped portions of images that contain the relevant person's face can be shown instead of showing a thumbnail of the whole original image. In such implementations, the relevant original image may be so large such that a thumbnail view may not be easily discernible by the user.

What is claimed is:
1. A computer-implemented method comprising:
  determining that a web page includes a first image of a particular person and a second image of the particular person;
  determining one or more image quality characteristics of the first image included in the web page and one or more image quality characteristics of the second image included in the web page;
  determining a score of the first image with respect to the particular person based on the one or more image quality characteristics of the first image;

determining a score of the second image with respect to the particular person based on the one or more image quality characteristics of the second image;

selecting, based on the score of the first image included in the web page and the score of the second image included in the web page, the first image or the second image as a representative image of the particular person in the web page; and storing, in an index, data indicating the selected image as a representative image of the particular person in the web page.

2. The method of claim 1, comprising:

receiving a search query that includes the name of the particular person;

determining that the web page has been identified as responsive to the search query; and determining, based on data in the index, that the selected image is the image of the particular person in the web page.

3. The method of claim 1, wherein the one or more image quality characteristics of the first image comprise a file size of the first image, a color of the first image, or a face to image ratio for the first image.

4. The method of claim 3, wherein determining a score of the first image with respect to the particular person based on the one or more image quality characteristics of the first image comprises determining the score of the first image based on a file size of the first image; and wherein determining the score of the second image with respect to the particular person based on the one or more image quality characteristics of the second image comprises determining the score of the second image based on a file size of the second image, the file size of the second image being larger than the file size of the first image and the score of the second image being greater than the score of the first image.

5. The method of claim 3, wherein determining a score of the first image with respect to the particular person based on the one or more image quality characteristics of the first image comprises determining the score of the first image based on a size of a face in the first image; and wherein determining the score of the second image with respect to the particular person based on the one or more image quality characteristics of the second image comprises determining the score of the second image based on a size of a face in the second image, the face in the second image being larger than the face in the first image and the score of the second image being greater than the score of the first image.

6. The method of claim 1, wherein the first image and the second image each include a face of the particular person.

7. The method of claim 1, comprising:

receiving a search query that includes a name of the particular person; and wherein determining that the web page includes the first image of the particular person and the second image of the particular person comprises determining, in response to receiving the search query, that the web page includes the first image of the particular person and the second image of the particular person.

8. The method of claim 1, further comprising:

receiving a search query that includes a name of the particular person;

determining that the web page has been identified as responsive to the search query; and providing a search results page that includes (i) a search result including a link to the web page and (ii) the selected image.

9. The method of claim 8, wherein providing the search result page comprises providing a search result page in which the selected image is positioned adjacent to the link to the web page.

10. The method of claim 1, wherein determining a score of the first image with respect to the particular person based on the one or more image quality characteristics of the first image comprises determining the score of the first image based on a number of faces in the first image.

11. A system comprising:

one or more computers and one or more storage devices storing instructions that are operable, when executed by the one or more computers, to cause the one or more computers to perform operations comprising:

determining that a web page includes a first image of a particular person and a second image of the particular person;

determining one or more image quality characteristics of the first image included in the web page and one or more image quality characteristics of the second image included in the web page;

determining a score of the first image with respect to the particular person based on the one or more image quality characteristics of the first image;

determining a score of the second image with respect to the particular person based on the one or more image quality characteristics of the second image;

selecting, based on the score of the first image included in the web page and the score of the second image included in the web page, the first image or the second image as a representative image of the particular person in the web page; and storing, in an index, data indicating the selected image as a representative image of the particular person in the web page.

12. The system of claim 11, wherein the operations further comprise:

receiving a search query that includes the name of the particular person;

determining that the web page has been identified as responsive to the search query; and determining, based on data in the index, that the selected image is the image of the particular person in the web page.

13. The system of claim 11, wherein the one or more image quality characteristics of the first image comprise a file size of the first image, a color of the first image, or a face to image ratio for the first image.

14. The system of claim 13, wherein determining a score of the first image with respect to the particular person based on the one or more image quality characteristics of the first image comprises determining the score of the first image based on a file size of the first image; and wherein determining the score of the second image with respect to the particular person based on the one or more image quality characteristics of the second image comprises determining the score of the second image based on a file size of the second image, the file size of the second image being larger than the file size of the first image and the score of the second image being greater than the score of the first image.

15. The system of claim 13, wherein determining a score of the first image with respect to the particular person based on the one or more image quality characteristics of the first image comprises determining the score of the first image based on a size of a face in the first image; and wherein determining the score of the second image with respect to the particular person based on the one or more image quality characteristics of the second image comprises determining the score of the second image based on a size of a face in the second image, the face in the second image being larger than the face in the first image and the score of the second image being greater than the score of the first image.

16. The system of claim 11, wherein the first image and the second image each include a face of the particular person.

17. The system of claim 11, wherein the operations further comprise:

receiving a search query that includes a name of the particular person; and wherein determining that the web page includes the first image of the particular person and the second image of the particular person comprises determining, in response to receiving the search query, that the web page includes the first image of the particular person and the second image of the particular person.

18. A non-transitory computer-readable medium storing software comprising instructions executable by one or more computers which, upon such execution, cause the one or more computers to perform operations comprising:

determining that a web page includes a first image of a particular person and a second image of the particular person;

determining one or more image quality characteristics of the first image included in the web page and one or more image quality characteristics of the second image included in the web page;

determining a score of the first image with respect to the particular person based on the one or more image quality characteristics of the first image;

determining a score of the second image with respect to the particular person based on the one or more image quality characteristics of the second image;

selecting, based on the score of the first image included in the web page and the score of the second image included in the web page, the first image or the second image as a representative image of the particular person in the web page; and storing, in an index, data indicating the selected image as a representative image of the particular person in the web page.

19. The medium of claim 18, wherein the one or more image quality characteristics of the first image comprise a file size of the first image, a color of the first image, or a face to image ratio for the first image.

20. The medium of claim 18, wherein the first image and the second image each include a face of the particular person.

* * * * *